US009162294B2

(12) United States Patent
Hocheng et al.

(10) Patent No.: US 9,162,294 B2
(45) Date of Patent: Oct. 20, 2015

(54) APPARATUS AND METHOD FOR DELAMINATION REDUCTION OF COMPOSITE MATERIALS

(76) Inventors: Hong Hocheng, Hsinchu (TW); Chung-chen Tsao, Hsinchu (TW); Yen Chu Chen, Hsinchu (TW)

( * ) Notice: Subject to any disclaimer, the term of this patent is extended or adjusted under 35 U.S.C. 154(b) by 461 days.

(21) Appl. No.: 13/620,701

(22) Filed: Sep. 14, 2012

(65) Prior Publication Data

US 2014/0079497 A1 Mar. 20, 2014

(51) Int. Cl.
*B23B 41/00* (2006.01)
*B23B 47/00* (2006.01)
*B23B 35/00* (2006.01)

(52) U.S. Cl.
CPC ............ *B23B 35/005* (2013.01); *B23B 2226/27* (2013.01); *Y10T 408/03* (2015.01); *Y10T 408/5626* (2015.01)

(58) Field of Classification Search
CPC .............. B23B 35/005; B23B 2226/27; Y10T 408/5626
USPC ...................................... 408/87, 99
See application file for complete search history.

(56) References Cited

U.S. PATENT DOCUMENTS

| 317,886 | A | * | 5/1885 | Thompson | 408/99 |
|---|---|---|---|---|---|
| 357,807 | A | * | 2/1887 | Allen et al. | 408/99 |
| 1,995,505 | A | * | 3/1935 | Goss et al. | 144/24.16 |
| 2,835,147 | A | * | 5/1958 | Baifour, Jr. | 408/99 |
| 2,975,661 | A | * | 3/1961 | Coleman | 408/113 |
| 3,260,138 | A | * | 7/1966 | Frizzell | 408/99 |
| 8,770,567 | B2 | * | 7/2014 | Piggott et al. | 269/266 |

OTHER PUBLICATIONS

Delamination reduction in drilling composite materials by active backup force by C.C. Tsao et al. extracted from CIRP Annals—Manufacturing Technology 61 (2012) 91-94 at http://dx.doi.org/10.106/j.crip.2012.03.036.

* cited by examiner

*Primary Examiner* — Eric A Gates
(74) *Attorney, Agent, or Firm* — Chun-Ming Shih

(57) ABSTRACT

The present invention provides a drilling apparatus and a method thereof capable of providing an adjustable active backup force to a composite workpiece to effectively reduce the delamination of the workpiece during drilling such that the application of the active backup force in terms of its force magnitude and its application location on the workpiece can adjustably counter the drill thrust force to retard the onset of delamination growth and reduce delamination damage at the drill exit in the workpiece, in particular in situation where large feed rate with short cycle time is desired for drilling of composite materials. A critical drill thrust force of the drilling apparatus and the method of the present invention is advantageously obtained in relation to said active backup force and the application of the active backup force to reduce the crack propagation of the delamination occurred in the composite workpiece.

5 Claims, 12 Drawing Sheets

APPARATUS AND METHOD FOR DELAMINATION REDUCTION OF COMPOSITE MATERIALS

FIELD OF THE INVENTION

The present invention relates to an apparatus and a method for reduction of delamination during the drilling of composite materials; more particularly, it relates to a drilling apparatus utilizing a means for providing active backup force to a work piece of composite material in layered form and to a method of providing such active backup force for the drilling of such composite work piece.

BACKGROUND OF THE INVENTION

Composite materials in structural parts have been widely used in various fields and applications replacing materials such as metal alloys due to their superior properties of high strength-to-weight ratio, high fracture toughness and excellent corrosion resistance. Recently the amounts of composite laminates used in aerospace industry have increased dramatically, for example, the use of composite materials for the construction of airline jets such as Boeing 787 Dream-liner and Airbus A350 increases significantly and are over 50% of the whole vehicle weight, respectively. For design and safety purposes, it is crucial to maintain structural stability and rigidity during the manufacturing of the device including transportation vehicles and airplanes. Drilling of construction materials is also one of the major parts of the whole production/assembly processes. A market demand in the aerospace industry, as an example, shows that there is approximately a demand for around 50 million holes per year to be drilled utilizing automatic manufacturing process. This automation, however, should ensure the drilling quality of composite-based components while minimizing manufacturing cost and optimizing resources.

Amongst all hole-making operations for joining purpose, mechanical drilling with a drill bit is conveniently and economically adopted for producing riveted and bolted joints during assembly operations. However, the defects and damages, such as delamination, burr, microcracking, swelling, splintering and fiber pullout, are commonly visible after drilling. The delamination at the entrance and exit planes of workpiece appears to be the most critical defect, which results in lowering the bearing strength and requires additional manufacturing operation to repair for increasing its service life under fatigue loads.

Past studies, including the ones by inventors Hocheng and Tsao, shown that the thrust force is a major factor responsible for drilling-induced delamination and it mainly depends on drill materials, drill geometry and feed rate. Linear elastic fracture mechanics are employed to construct the analytical model of the drilling-induced delamination. The model correlates the delamination of composite laminates with drilling thrust force and composite material properties. One solution is to reduce the thrust force and such reducing thrust force at the drill exit in the workpiece may be adopted to avoid delamination. Hocheng and Tsao also summarized various analytical models for special drills, such as candle stick drill, saw drill, core drill and step drill, and summarize the critical thrust force models of special drill bits for delamination-free drilling of composite laminates as well as the ones of several non-traditional machining processes for composite laminates. Hocheng and Tsao realize that making the thrust force low or distributed outward from the drill center can reduce the delamination. However, such reduction of thrust force is not optimal considering the low speed of the manufacturing as a whole and the costs to the production line to accommodate such low speed drilling process during manufacturing of design parts utilizing composite materials.

Apart from the abovementioned efforts made to reduce the thrust force from drill bits, there is another solution to reduce the delamination in drilling of composite materials and that is the use of a supporting plate (consumed plate) during the drilling composite materials. Such method or practice is common in some manufacturing industries and is known as the "passive" backup utilizing a consumed plated to support the back of composite workpiece to prevent deformation leading to exit delamination. Nevertheless, such use of passive backup to support composite workpiece in drilling as a backup is not optimal, again in terms of the costs, speed and maintenance of the manufacturing process as a whole. The use of backup or consumed plate as it is always consumed and then wasted or scraped, the cost of the production is inevitably increased, especially for workpiece of large design parts. Also, operation efforts must be made during drilling process to continuously monitoring and adjusting positions of the passive backup or consumed plate such that proper backups can be provided for the composite workpiece in drilling to avoid unsupported areas of perforations or consumed areas being repeatedly utilized, which too inevitably increases the costs, speed and operation steps of the manufacturing process.

In view of the above and with regard to the drilling of composite material in the field, it is therefore optimal to provide a solution capable of reducing delamination of the drilled composite material in a layered form. In other words, there is a need for a drilling apparatus and/or providing an effective method capable of overcoming the drawbacks of the known arts to reduce delamination or propagation of cracks of composite material during drilling or after drilling thereon, such that the drilling speed of the workpiece of a composite material in a layered form may be increased with reduced or controlled delamination including propagation of cracks thereon and such that the drilling production rate and costs can be reduced significantly.

SUMMARY OF THE INVENTION

In order to overcome the shortcomings described above, one aspect of the present invention is to provide a drilling apparatus capable of providing "active" backup force to workpiece of composite materials in a layered form to effectively reduce the delamination of the workpiece in drilling, preferably without compromising to the reduction of thrust force and/or feed rate of the drill bit and to the scrap of passive plates.

Another aspect of the present invention is to provide a drilling method capable of providing "active" backup force to workpiece of composite materials in a layered form to effectively reduce the delamination of the workpiece in drilling, preferably without compromising to the reduction of thrust force and/or feed rate of the drill bit and to the scrap of passive plates, wherein said backup force is correlated to the thrust force in drilling at the drill exit in terms of the applied location and magnitude on delamination in drilling.

Another aspect of the present invention is to provide an active backup force mechanism capable of providing an active backup force of a force magnitude correlated to the thrust force of drill bit applied in drilling of a composite workpiece at the drill exit and in terms of the force applied location as well as the drill bit size or bit radius.

Another aspect of the present invention is to provide a method of obtaining a critical thrust force $F_B^*$ at an onset of crack propagation of delamination of a composite workpiece during drilling. An adjustable active backup force can be applied by an active backup force mechanism to counter the thrust force $F_B$ of the drilling apparatus such that the critical thrust force $F_B^*$ can be increased while reducing the delamination of the composite workpiece, i.e. maintaining or reducing delamination or propagation of crack in comparison to the ones without the application of active backup force.

In one embodiment of the present invention, a drilling apparatus capable of providing a reduction of delamination of composite materials is provided. The drilling apparatus of the present invention comprises a workpiece of a composite material in a layered form having a drill-entrance surface and a drill-exit surface, a supporting base provided on said drill-exit surface of the workpiece and configured to receive said workpiece, a drill bit for drilling of said workpiece with a thrust force $F_B$ and having an outer perimeter of a bit radius C and provided on a side of said drill-entrance surface of the workpiece and to travel at a feed rate in a first direction toward said drill-exit surface thereof, and an active-force exertion mechanism for providing an active backup force R to said drill-exit surface of the workpiece in a second direction toward the drill-entrance surface and at a contact region having an exertion distance δ away from said outer perimeter of the drill bit.

The active backup force mechanism further comprises a contact bracket at least partially contacting said drill-exit surface of the workpiece, preferably at the contact region, and an adjustable force generator for driving said contact bracket to displace in said second direction toward said drill-entrance surface of the workpiece. The active backup force R is of a force magnitude correlated to said thrust force $F_B$ of the drill bit such that delamination of the workpiece is reduced.

According to another embodiment of the present invention, a method of providing an active backup for drilling of composite materials is advantageously provided. Said method comprises the steps of: providing a workpiece of a composite material in a layered form having a drill-entrance surface and a drill-exit surface, affixing said workpiece to a supporting base against said drill-exit surface of the workpiece, providing a drill bit with a bit radius C for drilling of said workpiece with a thrust force $F_B$ on said drill-entrance surface of the workpiece and to travel at a feed rate in a first direction toward said drill-exit surface thereof, and providing an active backup force R to said drill-exit surface of the workpiece in a second direction toward the drill-entrance surface of the workpiece and at a contact region having an exertion distance δ away from said outer perimeter of the drill bit.

Furthermore, to advantageously provide an adjustable active backup force, a method of obtaining a critical thrust force $F_B^*$ at an onset of crack propagation of delamination of composite workpiece is provided. The critical thrust force $F_B^*$ can be increased as said active backup force is applied to counter such thrust force on the composite workpiece during drilling. The critical thrust force FB* obtained is also correlated to critical crack propagation energy per unit area $G_{IC}$, flexural rigidity of the reinforced composite material M, bit radius C, exertion distance δ, active backup force R and an extend A of said delamination.

The foregoing summary recites preferred embodiments of the present invention and is for illustrative purposes only. Embodiments of the present invention may be implemented in various different ways and shall too be considered as part of the present invention within its scope. Details of the exemplary embodiments of the present invention will be further described in the following.

BRIEF DESCRIPTION OF THE DRAWINGS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the apparatus or of the sequence of the steps of the method of the present invention shall too be considered to be within the spirit of the present invention.

DESCRIPTION OF EMBODIMENTS OF THE INVENTION

Figure 1:
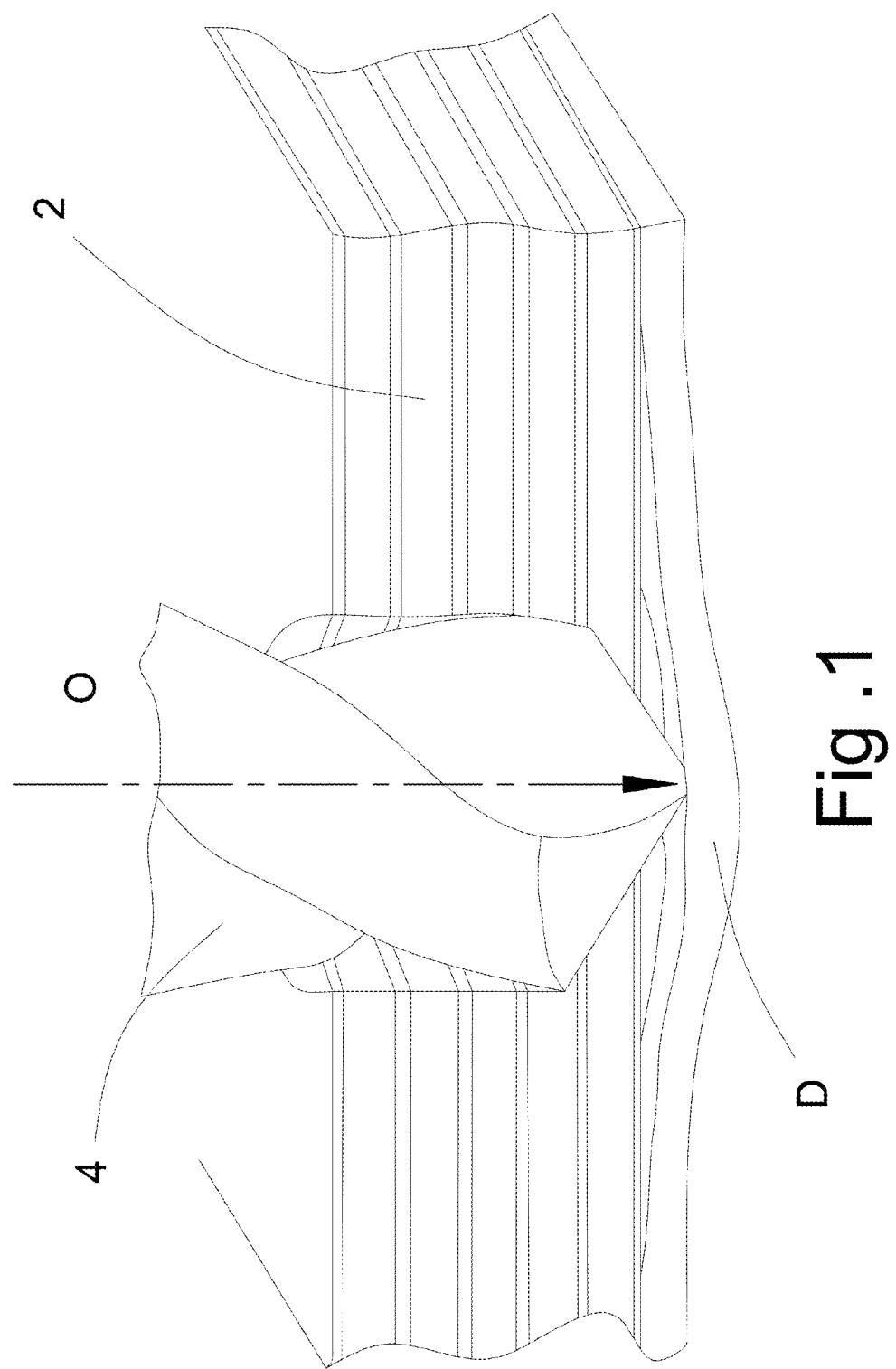
FIG. 1 shows an illustration of a schematic sectional view of a common composite workpiece with delamination during drilling without backup forces or passive backups.

The present invention provides a drilling apparatus capable of providing a reduction of delamination of composite materials and a method of providing an active backup for drilling of composite materials such that the delamination or crack propagation f a composite workpiece during drilling can be effectively reduced. In order to understand the effect of active backup or active backup force provided to a composite workpiece for drilling, a basic model of common drilling thrust-induced delamination is provided to illustrate such effect and as a comparison basis. FIG. 1 depicts a physical model of the drilling thrust-induced delamination in composite materials. As the thrust force F of a drill bit 4 is applied onto the composite workpiece 2 in a layered form, the exit layer of the composite workpiece 2 is deformed or separated in parts and lead to delamination D under a normal condition where no active backup force is applied to counter said thrust force F. In other words, the drill 4 pushes the uncut laminate of the composite workpiece 2 to bend downward by the thrust force F. The larger the force F, the larger is the deformation of laminate underneath the drill 2. At a certain level of the thrust force F, the interlaminar crack occurs when the interlaminar bonding strength can no longer withhold the bending deformation.

Figure 2:
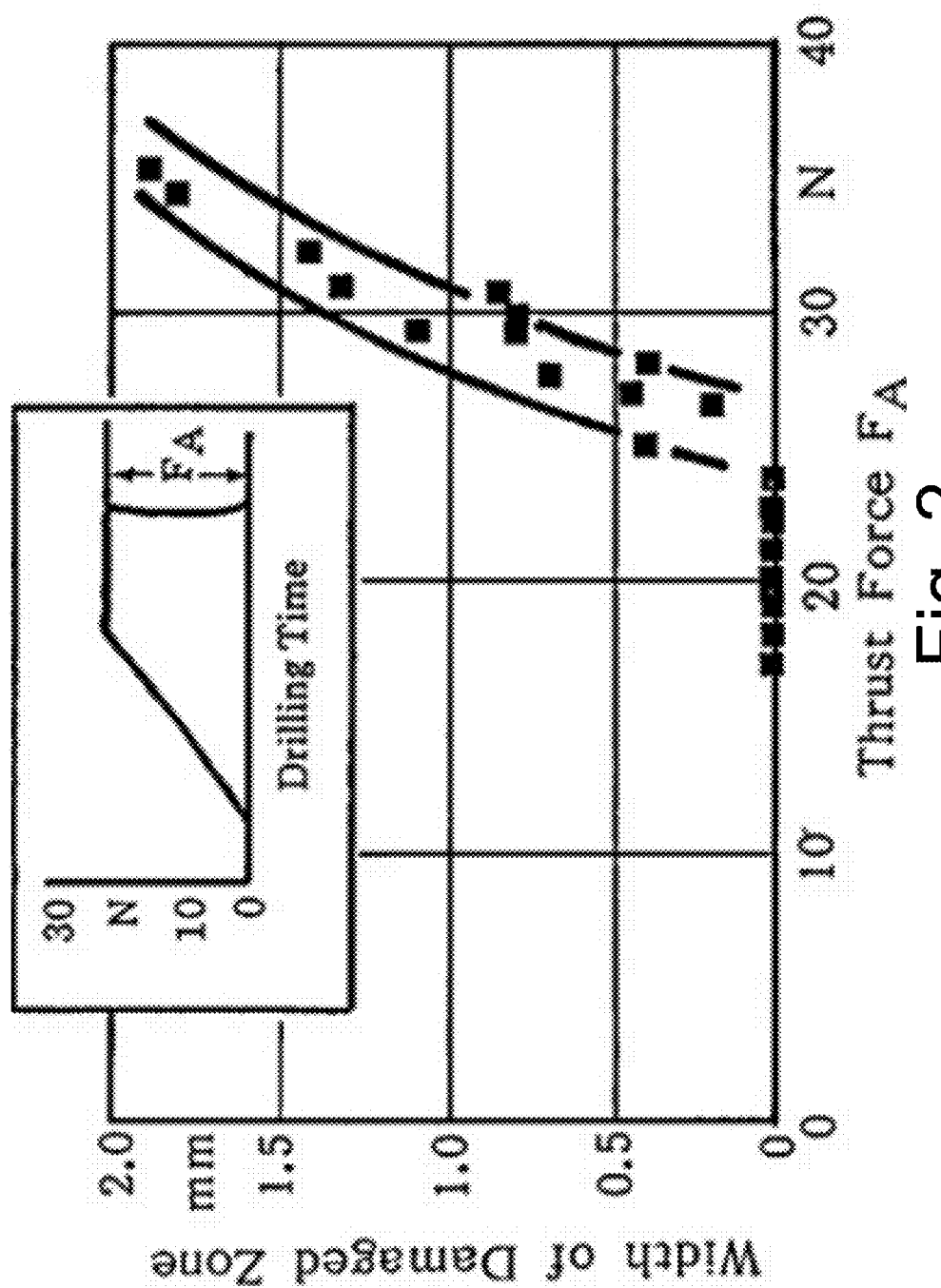
FIG. 2 shows an illustrative diagram depicting the relationship between the thrust force of drilling and the drilling thrust-induced delamination in composite materials.

According to a basic model of drilling thrust-induced delamination as illustrated in FIG. 2, there exists a critical thrust force $F_A$ during drilling of composite materials or composite workpiece ($F_A$ is used to denote critical thrust force under the condition where no active back force is applied), beyond which delamination occurs. Accordingly, the present invention provides a method of drilling composite workpiece, including the obtaining this critical thrust force and its value, as detailed in the later content. In addition, according to a drilling apparatus of the present invention capable of providing an adjustable active backup, in a control scheme, the feed rate of the drill bit 4 along the axial movement of the drill can be developed following the predicted values of drilling thrust force. The crack propagation is considered major for example in a Mode I fracture. This threshold value is called the critical thrust force $F_B$ at the onset of delamination. A theoretical analysis yields the critical thrust force of Eq. (1):

$$F^* = \pi \left[ \frac{8 G_{IC} E H^3}{3(1-v^2)} \right]^{1/2} \quad (1)$$

where E and n is Young's Modulus and Poisson's ratio of the material, respectively, GIC is the critical crack propagation energy per unit area in mode I, and H is the thickness of uncut laminate under tool.

Now, apart from the theoretical value of critical thrust force F* under the condition where no active backup force is applied during drilling of a composite workpiece, the present invention providing a drilling apparatus and a method for drilling composite materials aims to relieve the delamination of the composite workpiece being drilled such that the critical thrust force can be increased or maintained at a relatively productive level for industrial drilling applications. Having identified the essential role of thrust force in producing the delamination in drilling, it is important to control the thrust force for the reduction of delamination. A novel development of the present invention herewith disclosed is to apply an adjustable active backup force R, rather than the previously mentioned passive backing plate or consumed plate, to more accurately counter balance the push-out action by the drilling thrust force $F_B$ leading to delamination at the drill exit.

Figure 3:
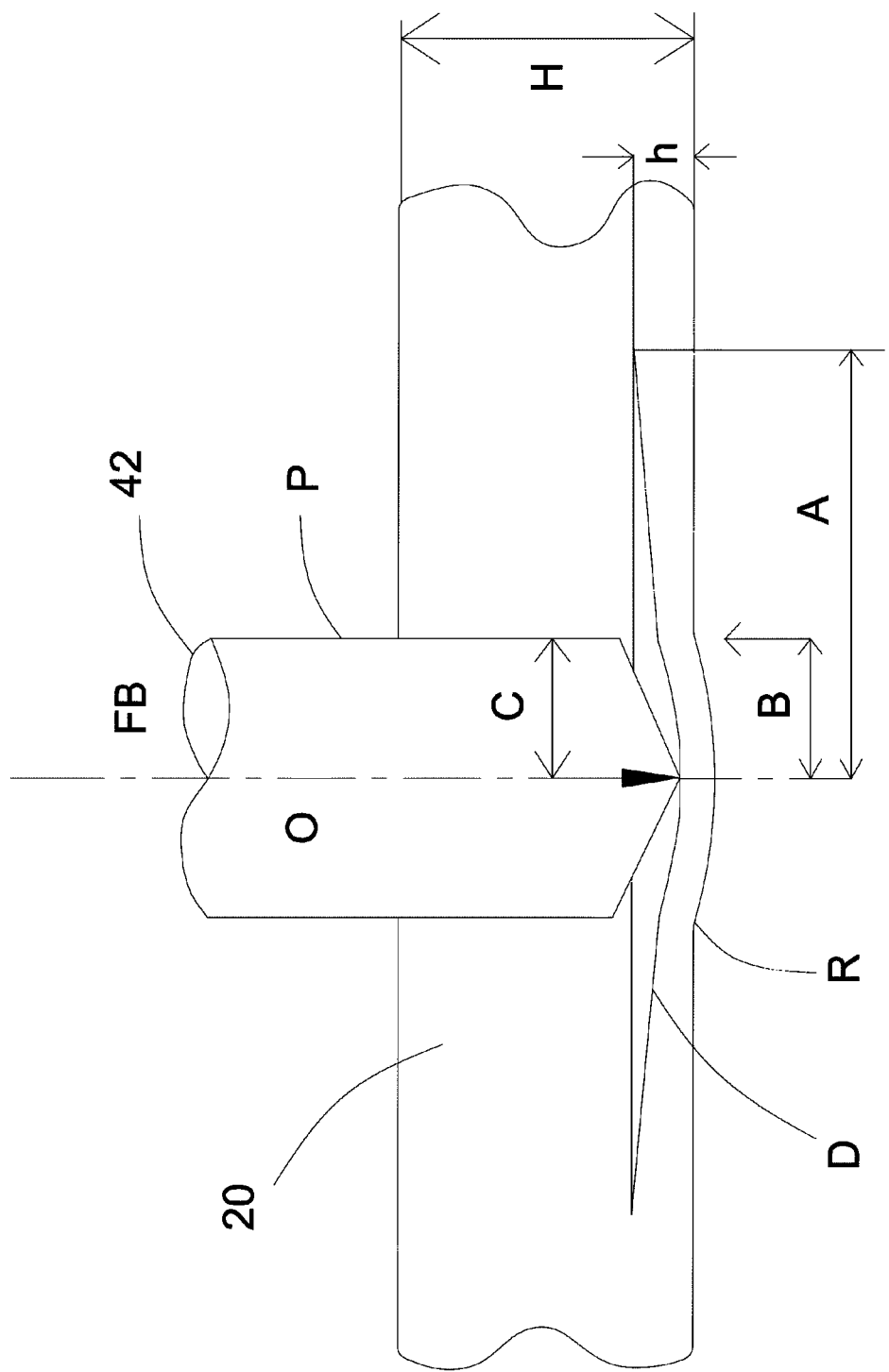
FIG. 3 is an illustration of a schematic sectional view of a composite workpiece during drilling with an active backup force of the present invention.

FIG. 3 depicts the schematics of the present invention illustrating a drilling apparatus 10 of the present invention capable of providing an active backup force R to a composite workpiece 20 in a layered form having a delamination model as described or outlined by relationships detailed below. The application of the active backup force R is exerted by an active-force exertion mechanism, such as a power actuator selected from any one of the following: electromagnetic actuator, hydraulic actuator, pneumatic actuator, motor-driven actuator, mechanical driver. As shown in the figure, B refers to the radius of the applied ring force of backup; in other words, the active-force exertion mechanism may further comprises a contact bracket of, for example, a continuous circular form or ring having a central perforation surrounded by an outer ring of a radius B. The center of the circular plate is loaded by a drill of radius C. $F_B$ is the thrust force with active backup, X is the displacement, H is the workpiece thickness, and A is the extent of delamination. It can be understood that the isotropic behavior and pure bending of the laminate are assumed to be true in determining or obtaining the critical thrust force $F_B$ value detailed in later content.

Figure 4:
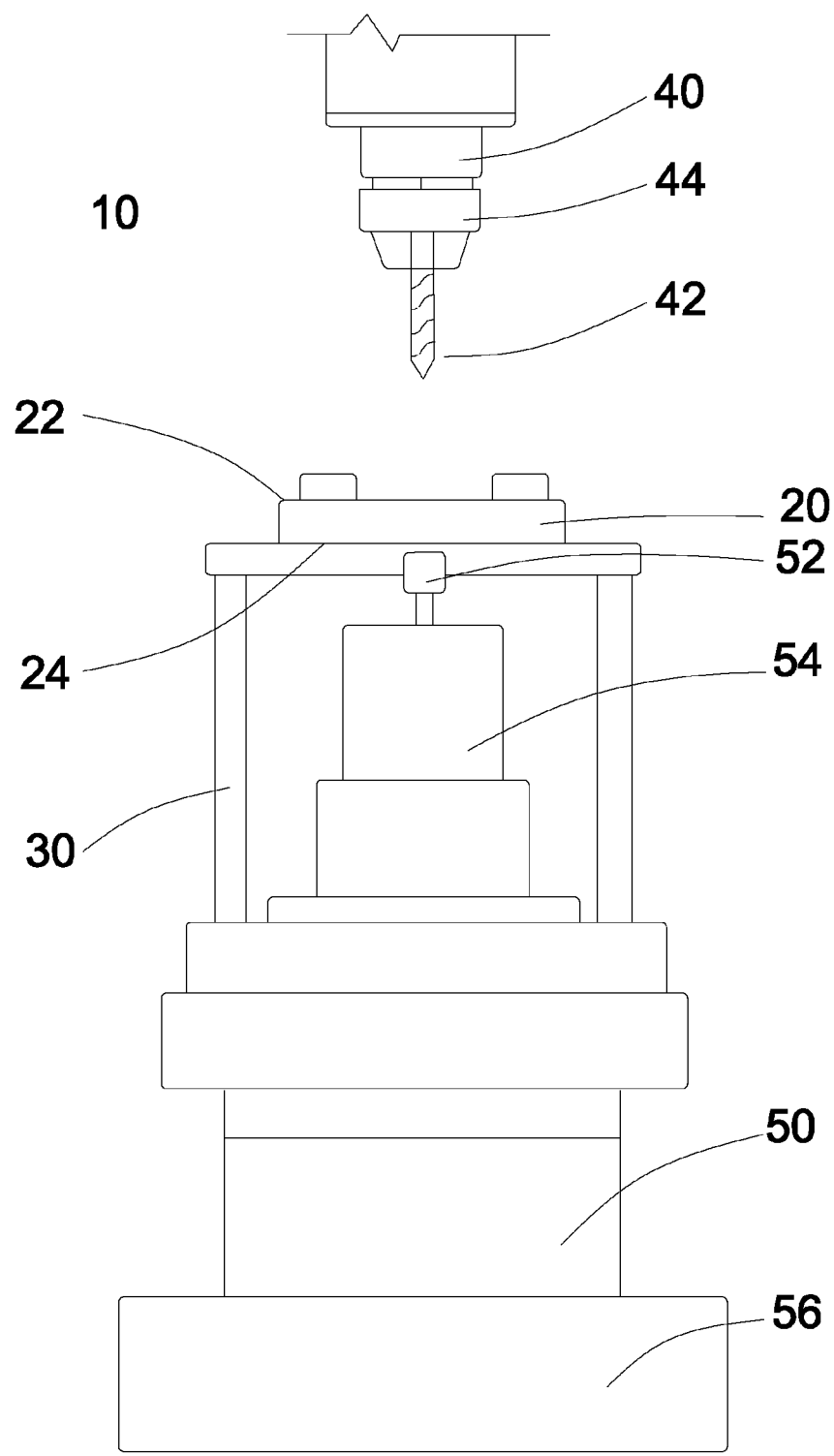
FIG. 4 is a schematic side view of a drilling apparatus with an adjustable active-force exertion mechanism according to one embodiment of the present invention.

Referring now to FIGS. 3 and 4. Accordingly, FIG. 4 shows an embodiment of a drilling apparatus 10 capable of providing a reduction of delamination of composite materials of the present invention. Said drilling apparatus 10 of the present invention comprises: a workpiece 20 of a composite material in a layered form with a thickness H defined by a drill-entrance surface 22 and a drill-exit surface 24 opposite of said drill-entrance surface 22 and spaced apart therefrom; a supporting base 30 provided on said drill-exit surface 24 of the workpiece 20, configured to receive said workpiece 20 and to restrict directional movements thereof; a drill bit 42 for drilling of said workpiece with a thrust force $F_B$, having an outer perimeter P of a bit radius C and a drilling axis O substantially perpendicular to said surfaces 22, 24 of the workpiece 20, provided on a side of said drill-entrance surface 22 of the workpiece 20 and to travel at a feed rate in a first direction X toward said drill-exit surface 24 thereof along the drilling axis O; and an active-force exertion mechanism 50 for providing an active backup force R to said drill-exit surface 24 of the workpiece 20 in a second direction substantially parallel to said drilling axis O of the drill bit 42 and at a contact region having an exertion distance δ away from said outer perimeter P of the drill bit 42, further comprising a contact bracket 52 at least partially contacting said drill-exit surface 24 of the workpiece 20 at said contact region and an adjustable force generator 54 for driving said contact bracket 52 to displace in said second direction toward said drill-entrance surface 22 of the workpiece 20; and wherein said active backup force R is of a force magnitude correlated to said thrust force $F_B$ of the drill bit 42 such that delamination A of the workpiece 20 is reduced. It too can be understood that the drill bit 42 may be configured to be a front part 44 of, for example, a spindle unit 40 coupled to the drilling apparatus 10 of the present invention.

Figure 5:
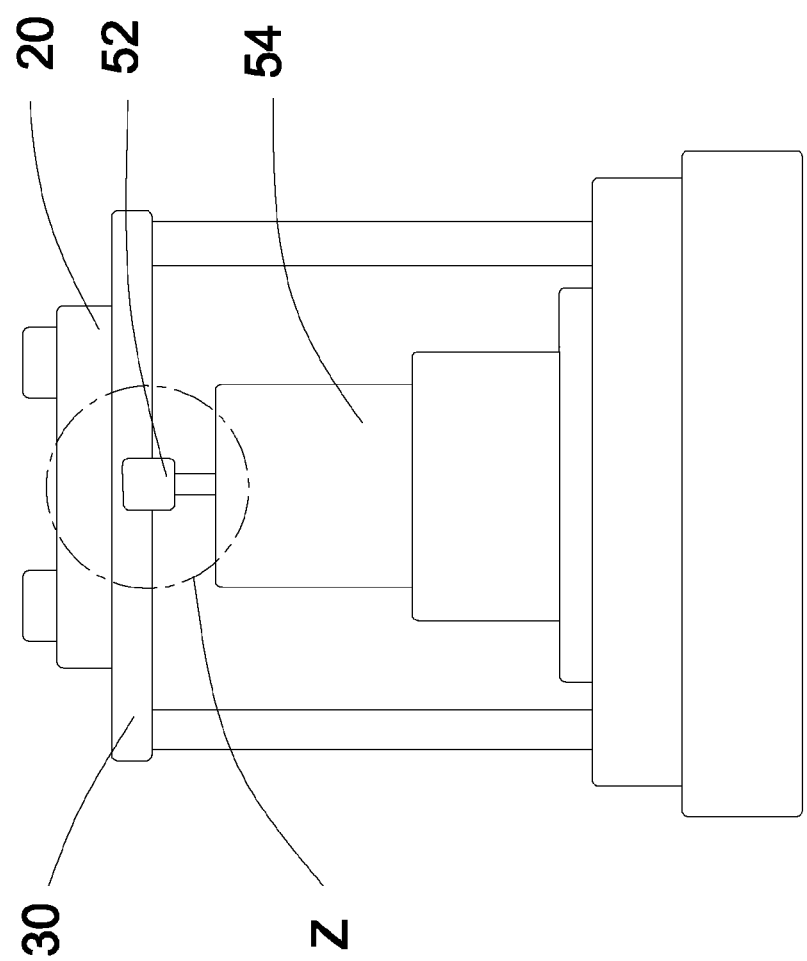
FIG. 5 is a schematic side view of the active-force exertion mechanism of the drilling apparatus of the present invention in FIG. 4.
Figure 6B:
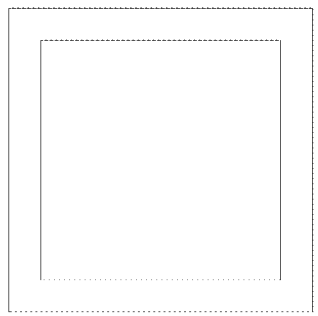
FIG. 6B shows a top view of another example of a contact bracket of the active-force exertion mechanism of area Z in FIG. 5.
Figure 6D:
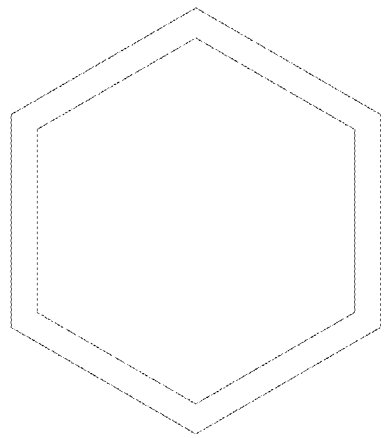
FIG. 6D shows a top view of another example of a contact bracket of the active-force exertion mechanism of area Z in FIG. 5.
Figure 6A:
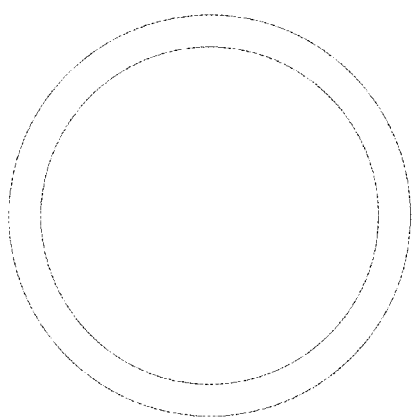
FIG. 6A shows a top view of an example of a contact bracket of the active-force exertion mechanism of area Z in FIG. 5.
Figure 6C:
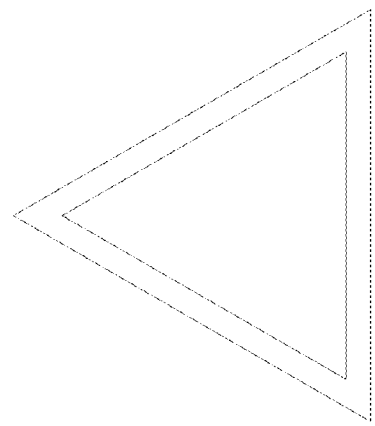
FIG. 6C shows a top view of another example of a contact bracket of the active-force exertion mechanism of area Z in FIG. 5.

FIG. 5 shows an embodiment of an active-force exertion mechanism 50 of the drilling apparatus 10 of the present invention. The active-force exertion mechanism 50 is a part of the drilling apparatus 10 of the present invention and is for providing an active backup force R to said drill-exit surface 24 of the workpiece 20 in a second direction substantially parallel to said drilling axis O of the drill bit 42 and at a contact region having an exertion distance δ away from said outer perimeter P of the drill bit 42. The contact region is preferably at the drill-exist surface 24 of the workpiece 20. In a preferred embodiment, as mentioned above, the mechanism 50 further comprises a contact bracket 52 at least partially contacting said drill-exit surface 24 of the workpiece 20 at said contact region. It may also include an adjustable force generator 54 for driving said contact bracket 52 to displace in said second direction toward said drill-entrance surface 22 of the workpiece 20.

FIGS. 6A-6D shows different embodiments of the above-mentioned contact bracket 52 of the active-force exertion mechanism 50. The shape of the contact bracket 52 is preferably to be of a ring form and such ring form may be made of wire or strip of relatively small thickness or diameter in cross-section. In a preferred embodiment, the contact bracket 52 of the active-force exertion mechanism 50 is of a continuous circular form having a central perforation surrounded by an outer ring of a radius B substantially equivalent to the sum of said bit radius C of the drill bit 42 and said exertion distance δ of the contact region, such as the shape in FIG. 6A. In another preferred embodiment, the contact bracket 52 of the active-force exertion mechanism 54 may comprise a series of point contacts (not shown) spaced apart from each other and arranged in a circular shape having a radius B substantially equivalent to the sum of said bit radius C of the drill bit 42 and said exertion distance δ of the contact region. It too can be understood that other shapes and forms of the contact bracket 52 in an enclosed or substantially closed ring configuration are also possible, such as a rectangular ring in FIG. 6B, triangular ring in FIG. 6C or hexagonal ring in FIG. 6D, as view from the top or bottom of the bracket 52.

The principle of energy preservation is applied to the analysis of thrust in association with the active backup force. At the propagation of delamination, the drill movement of distance (dX) is associated with the work done by the thrust force (F) to workpiece, which is used to deflect the plate as well as to propagate the interlaminar crack. The energy balance gives Eq. (2) as:

$$G_{IC}dA = FdX - du \quad (2)$$

where dU is the infinitesimal strain energy, dA is the increase in the area of the delamination crack.

The deflection and stored strain energy of the circular plate underneath drill bit are given by plate theory, respectively as Eq. (3) and Eq. (4) below:

$$X = \frac{1}{16\pi M}\left\{F_B A^2 - 2R\left[2b^2 \ln\frac{B}{A} + \frac{1}{2}\left(1 - \frac{B^2}{A^2}\right)(A^2 + B^2)\right]\right\} \quad (3)$$

$$U = \pi \int_0^b M\left(\frac{d^2X}{dr^2} + \frac{1}{r}\frac{dX}{dr}\right)^2 r\,dr =$$

$$\frac{1}{32\pi M}\left\{F_B^2 A^2 - R^2\left[A^2 + 4B^2 \ln\frac{B}{A} + \frac{B^4}{A^2}\right]\right\} \quad (4)$$

where $M = EH^3/12(1-v^2)$ is the flexural rigidity of the reinforced composite material. Differentiation of Eqs. (3) and (4) with respect to a and the subsequent substitution into Eq. (2) yield the critical thrust force $F_B^*$ with suppressing mechanism at the onset of crack propagation as shown and described by Eq. (5):

$$F_B^* = \pi\sqrt{\frac{32 G_{IC} M}{[(1-\gamma^2) + 2\gamma^2(1+\xi)^2 S^2 - \gamma^2(1+\xi)^4 S^4]}} \quad (5)$$

where $R = \gamma F_B$, $\delta = B - C = \xi C$ is the difference between the radius of suppressing load (b) and the radius of twist drill and $S = C/A$. The comparison of $F_B^*$ in Eq. (5) and $F^*$ in Eq. (1) gives $$\frac{F_B^*}{F^*} = \sqrt{\frac{1}{[(1-\gamma^2) + 2\gamma^2(1+\xi)^2 S^2 - \gamma^2(1+\xi)^4 S^4]}} \quad (6)$$

Accordingly, in one embodiment of the drilling apparatus 10 of the present invention, the force magnitude of the active backup force R is correlated to said bit radius C of the drill bit 42 and to said exertion distance δ of the contact region of the active-force exertion mechanism 50.

Referring now again to FIGS. 4 and 5, according to one preferred embodiment of the present invention, the adjustable force generator 54 for driving said contact bracket 52 of the active-force exertion mechanism 50 is a power actuator of the type of an electromagnetic actuator capable of being adjusted for an output in accordance with the electric or power input. It too can be understood that other types of power actuator including such as the following: hydraulic actuator, pneumatic actuator, motor-driven actuator, mechanical driver are also possible and within the spirit of the present invention.

Figure 7:
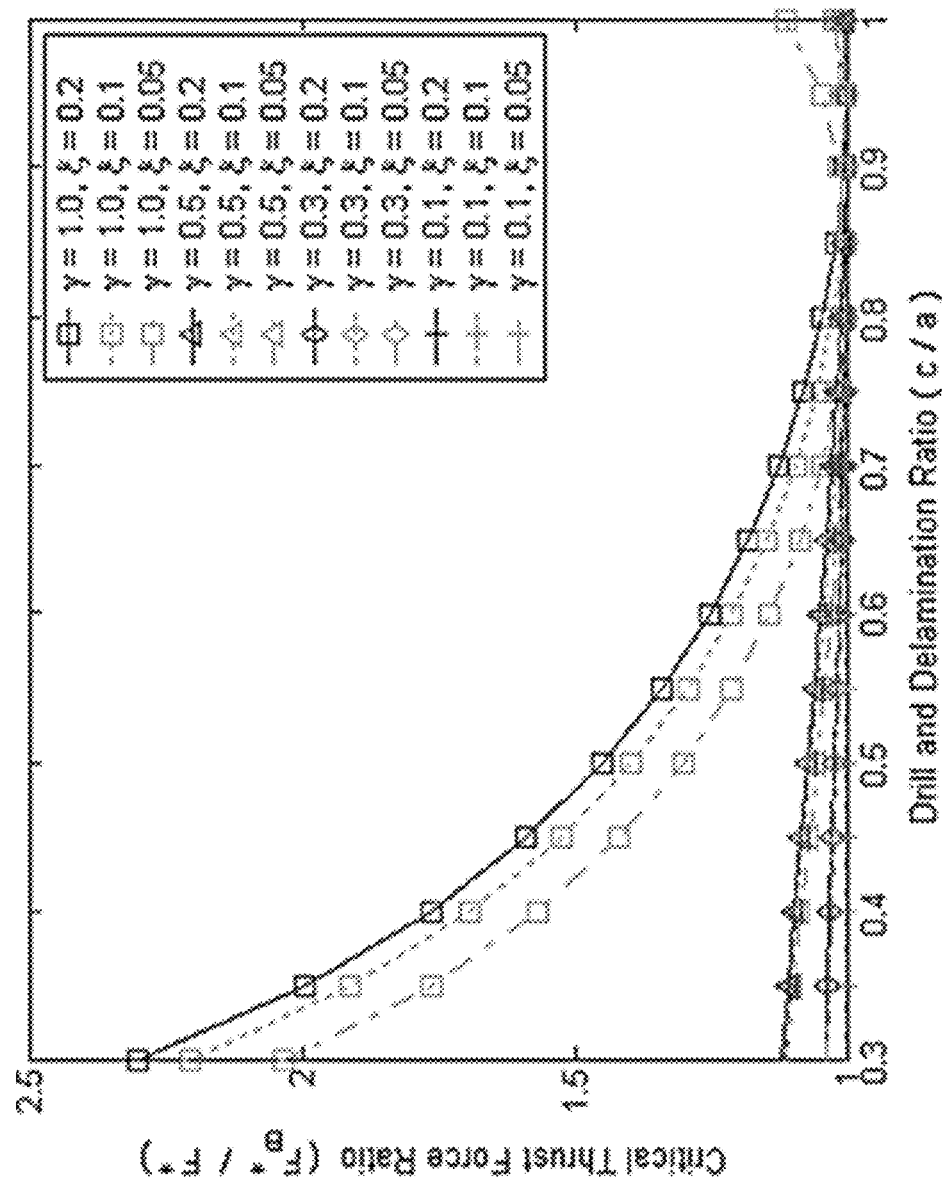
FIG. 7 shows an illustrative diagram depicting the relationship between the critical thrust force ratio and drill and delamination ratio of various ξ and γ.

FIG. 7 depicts the critical thrust force with the active backup from suppressing mechanism at various levels of γ and ξ. It is seen that the critical thrust force can be increased with the backup force. The backup force R helps suppress the delamination crack A as the drill approaches the last lamina, hence higher drilling thrust is needed to propagate the delamination A. Namely, when the threshold thrust force $F_B^*$ is higher, delamination crack A is less likely to occur. Once the backup force R is applied to the level of the drilling thrust $F_B$, the critical thrust $F_B^*$ can be elevated to more than 100% compared to that without active backup.

Accordingly, one of the merits of the present invention can be realized as the drilling can be then conducted at faster feed rate, hence shorter cycle time and lower manufacturing cost, with less concerns of delamination. The level of backup force R, however, is limited to about γ<2 in practice by the fixture rigidity needed for holding the workpiece 20 under drilling. In other words, the γ ratio is less than or equal to a value of 2 such that said force magnitude of the active backup force R provided on the drill-exit surface of the workpiece is less than or equal to twice the thrust force $F_B$ of the drill bit provided on the side of the drill-entrance of the workpiece. This effect is very much significant at large S, namely when the crack propagates far beyond the drill size. The result also shows that the larger the backup force R is, the more difficult it is for the delamination A to grow further; hence the drilling-induced delamination defect will be kept at low level and such that merits of the present invention can be realized.

In addition, regarding the delamination of size less than drill, as pointed out by Di Paolo et al., it is not of a concern because it is drilled out afterwards anyway. FIG. 7 also illustrates the critical thrust force $F_B^*$ is less changed with the location of backup compared to the influence of magnitude of backup force R.

According to another embodiment of the present invention, a method of providing an active backup for drilling of composite materials is provided. In a similar manner as the one of the features of the abovementioned drilling apparatus 10 of the present invention, and referring now again to FIGS. 4 and 5, identical elements below for said methods of the present invention are being denoted with identical numerals. Said method comprises the steps of: providing a workpiece 20 of a composite material in a layered form with a thickness H defined by a drill-entrance surface 22 and a drill-exit surface 24 opposite of said drill-entrance surface 22 spaced apart therefrom; affixing said workpiece 20 to a supporting base 30 against said drill-exit surface 24 of the workpiece 20 to restrict directional movements thereof; providing a drill bit 42 for drilling of said workpiece 20 with a thrust force $F_B$ on a side of said drill-entrance surface 22 of the workpiece 20 and to travel at a feed rate in a first direction toward said drill-exit surface 24 thereof along a drilling axis O and substantially perpendicular to said surfaces of the workpiece 20, wherein said drill bit 42 having an outer perimeter P of a bit radius C and a drilling axis O; and providing an active backup force R to said drill-exit surface 24 of the workpiece 20 in a second direction substantially parallel to said drilling axis O of the drill bit 42 and at a contact region having an exertion distance δ away from said outer perimeter P of the drill bit 42.

In addition, with respect to the abovementioned method of providing an active backup for drilling of composite materials of the present invention, the active backup force R is of a force magnitude correlated to said thrust force $F_B$ of the drill bit 42 and to said exertion distance δ of the contact region such that delamination A of the workpiece 20 is reduced. Also, in another embodiment of the method of providing an active backup force for drilling of composite materials of the present invention, the abovementioned contact bracket 52 of the active-force exertion mechanism 50 can too be of a continuous circular form having a central perforation surrounded by an outer ring of a radius B substantially equivalent to the sum of said bit radius C of the drill bit and said exertion distance δ of the contact region. Accordingly, it is obtained that the larger the backup force R is, the more difficult it is for the delamination A to grow further; hence the drilling-induced delamination defect will be kept at low level and such that merits of the present invention can be realized.

Experimental Analysis & Data

Related experimental data and analysis are further provided as illustrative examples to support the merits of the present invention; therefore, the following experimental data and analysis are for illustrative purposes only to demonstrate the principles of the present invention and shall not be treated as limitations of the present invention.

Figure 8:
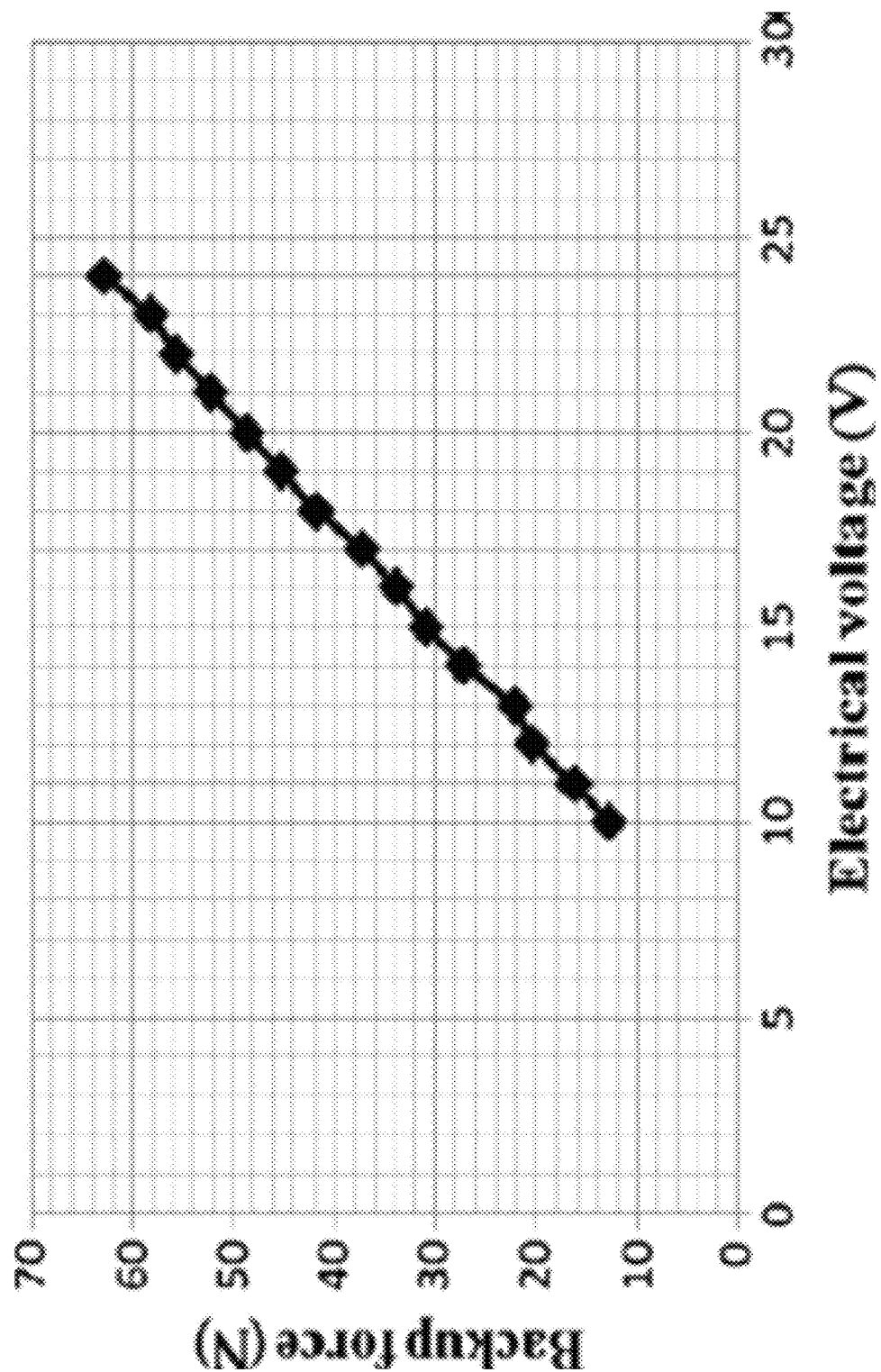
FIG. 8 shows an illustrative diagram depicting the relationship between the active backup force and the supplied voltage from an exemplary electromagnetic solenoid of the active-force exertion mechanism of the present invention.

In an experimental setup conducted to demonstrate the principles of the present invention, first of all, the composite materials used were fabricated from the prepreg woven WFC200 fabric carbon/epoxy using autoclave molding. The stacking sequence of the laminates is [0/90]8S. The carbon fiber reinforced plastics (CFRP) laminates were 4 mm thick consisting of 16 plies with 55% fiber volume fraction. Specimens of 60 mm|60 mm were cut on a water-cooled diamond table saw. Drilling tests were conducted on a vertical machining center where the thrust forces were measured with a Kistler 9273 piezoelectric dynamometer and Kistler 5007 charge amplifiers and recorded on computer. High-speed-steel twist drills were used throughout the experiment. All tests were run without coolant at spindle speed of 1000 rpm and feed rates of 30-120 mm/min. A tubular solenoid electromagnet is mounted to deliver the suppressing load. It can be readily implemented on the machine tool table. Once the workpiece is fixed on top of this device, the magnetic-driven backup is activated when the drilling starts. The backup is turned off when the drilling is completed. During drilling operation, this device offers active backup force. The DC electric voltage of 0 (namely without backup), 10 and 24 V, and ξ of 0.05, 0.1 and 0.2 were used in this study. In this experimental setup, an adjustable electromagnetic actuator is used as the force generator 54 of the active-force exertion mechanism 50 of the presentation. FIG. 8 shows the measured linear correlation between the active backup force and the supplied voltage from the electromagnetic solenoid or actuator. The ultrasonic C-scan is used for measuring the delamination on an AIT-5112 unit with 0.025 mm resolution scanning bridge, AIT-2230 ultrasonic pulse generator/receiver and a digital oscilloscope. In this study, a large number of high-contrast images, each consisting of 150|150 pixels, were obtained from each scanning. It can be understood that other types of power actuator such as one of the following: hydraulic actuator, pneumatic actuator, motor-driven actuator, mechanical driver can too be used.

Figure 9:
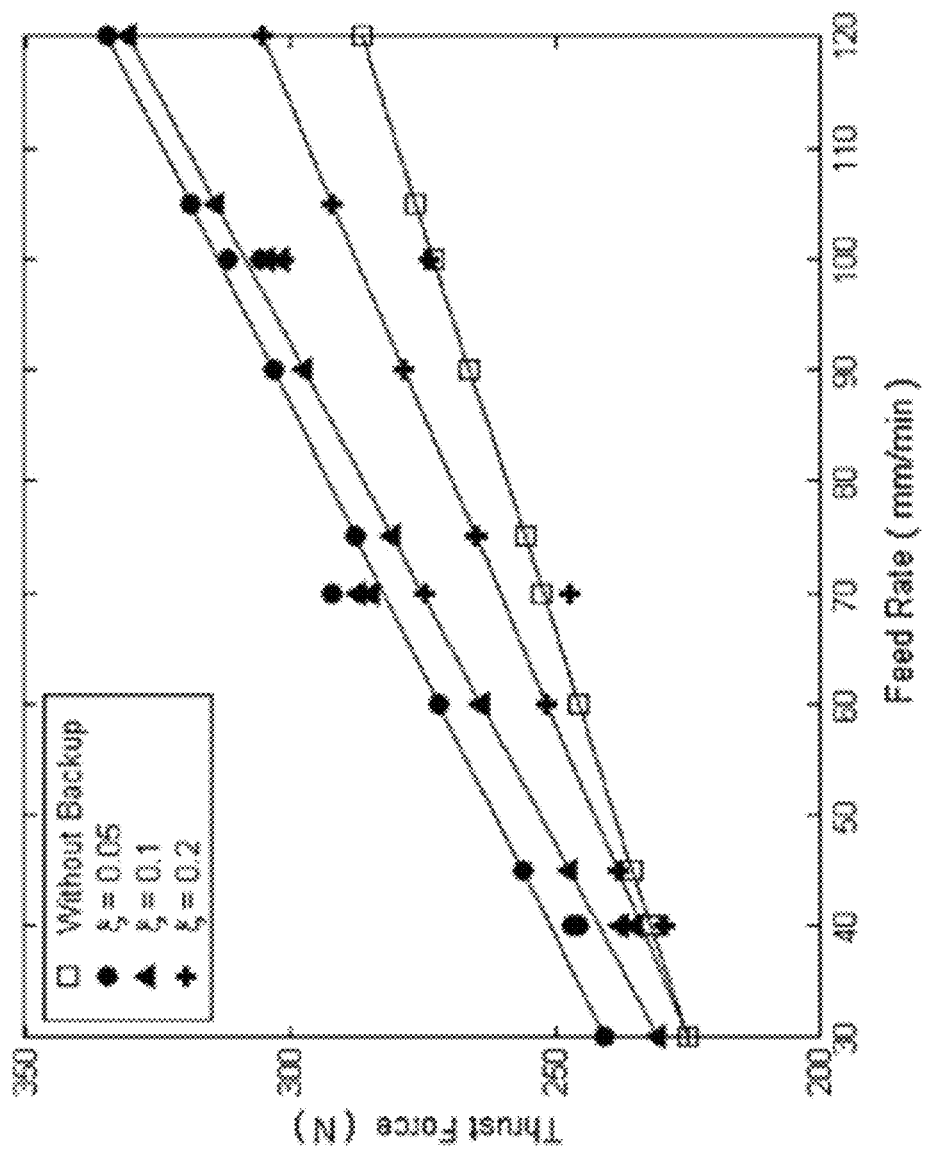
FIG. 9 shows an illustrative diagram depicting the relationship between the thrust force and the feed rate with/without active backup of the present invention utilizing an exemplary electromagnetic solenoid type of force exertion mechanism of FIG. 7.

FIG. 9 indicates the thrust force $F_B$ increases with the feed rate as commonly seen in practice. The application of backup R causes an increase of the drilling force in axial thrust due to the increased rigidity of the structure underneath drill bit 42. The closer the backup R is applied to the drill bit 42, namely smaller ξ, the more rigid is the whole structure subject to drilling. This effect is slightly stronger at higher feed rates; hence the thrust force $F_B$ increases more with active backup force R than simple drilling without backup.

Figure 10:
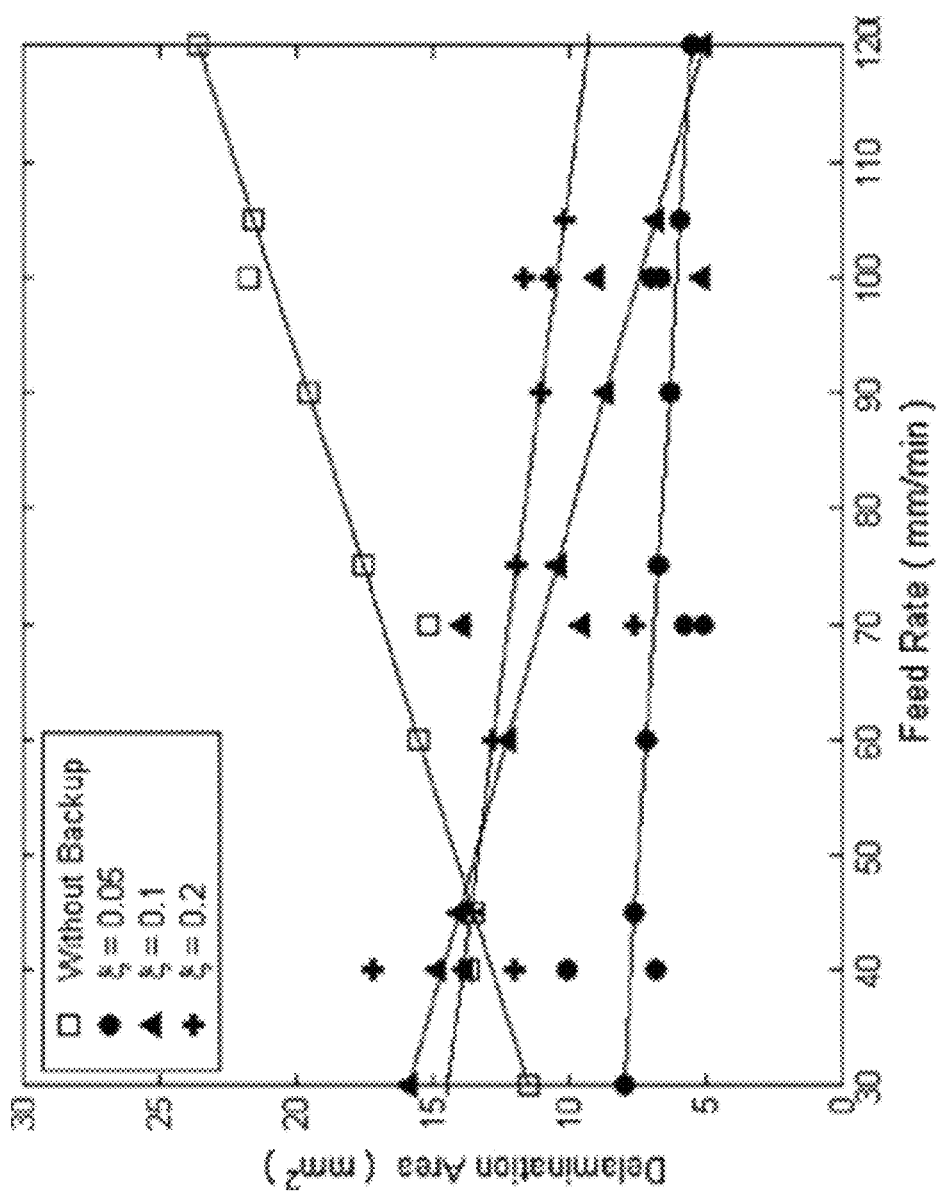
FIG. 10 shows an illustrative diagram depicting the relationship between the extend of delamination and the feed rate, demonstrating the effects of active backup at various location on delamination reduction.
Figure 11:
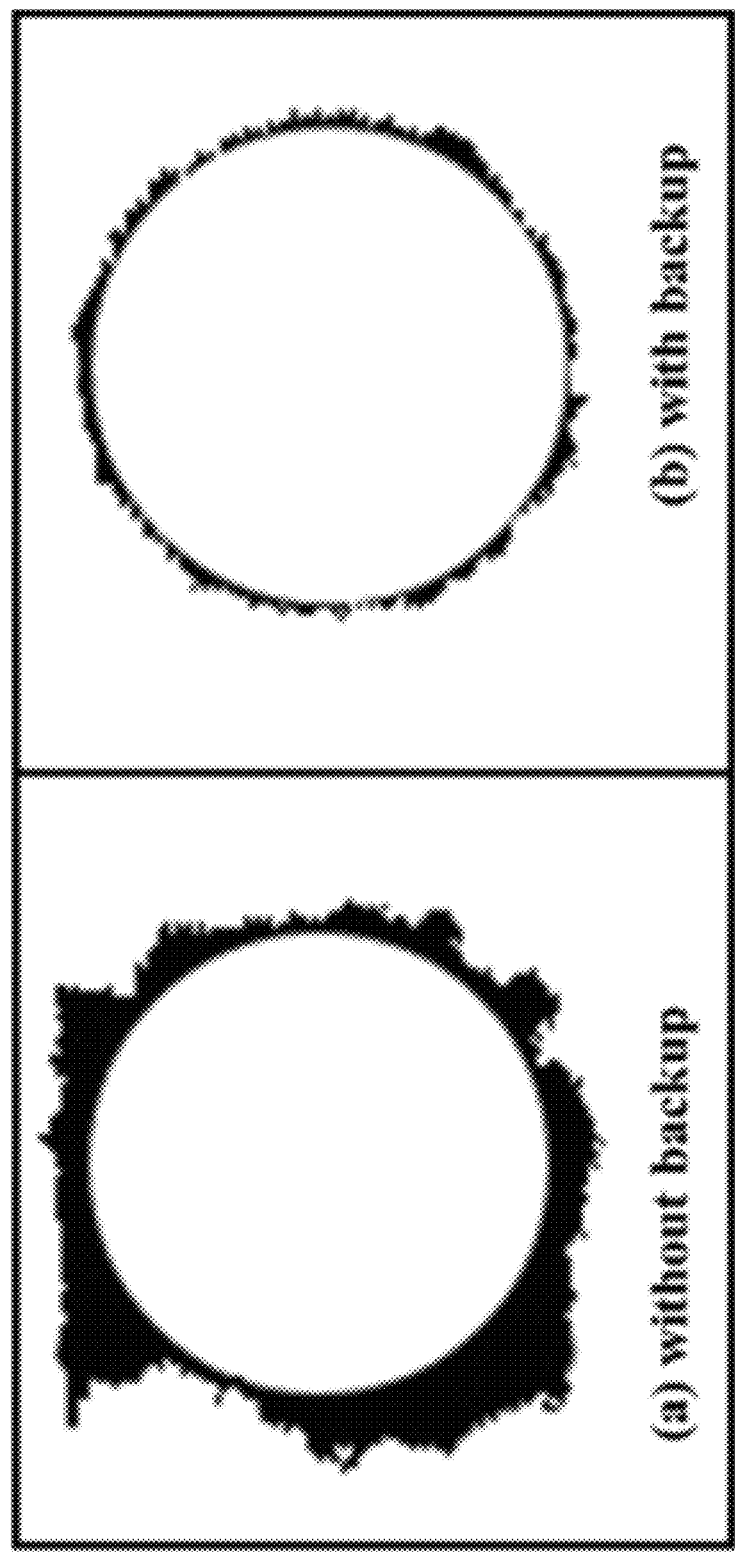
FIG. 11 shows an illustrative diagram depicting the relationship between the extend of delamination and the feed rate, demonstrating the effects of active backup of various backup force magnitude.

The major finding, as shown in FIG. 10, is that the delamination extent A can be reduced by 60-80% at high feed rate when the active backup force R is applied, in contrary to the often found increasing delamination with feed rates when no backup is provided. With the active backup force R, the higher the feed rate, the lower the delamination is. When the backup force R is applied closer to the drill bit 42, ξ of 0.05, the suppression of delamination is more effective. On the other hand, when the backup force R is applied farther therefrom, ξ at 0.1 and 0.2, its effects are seen stronger at high feed rates at which the delamination A grows farther. FIGS. 11(a) and 11(b) demonstrates the drilling induced delamination at exit without and with the active backup respectively, where FIG. 11(b) shows significantly reduction of delamination with the active backup.

Figure 12:
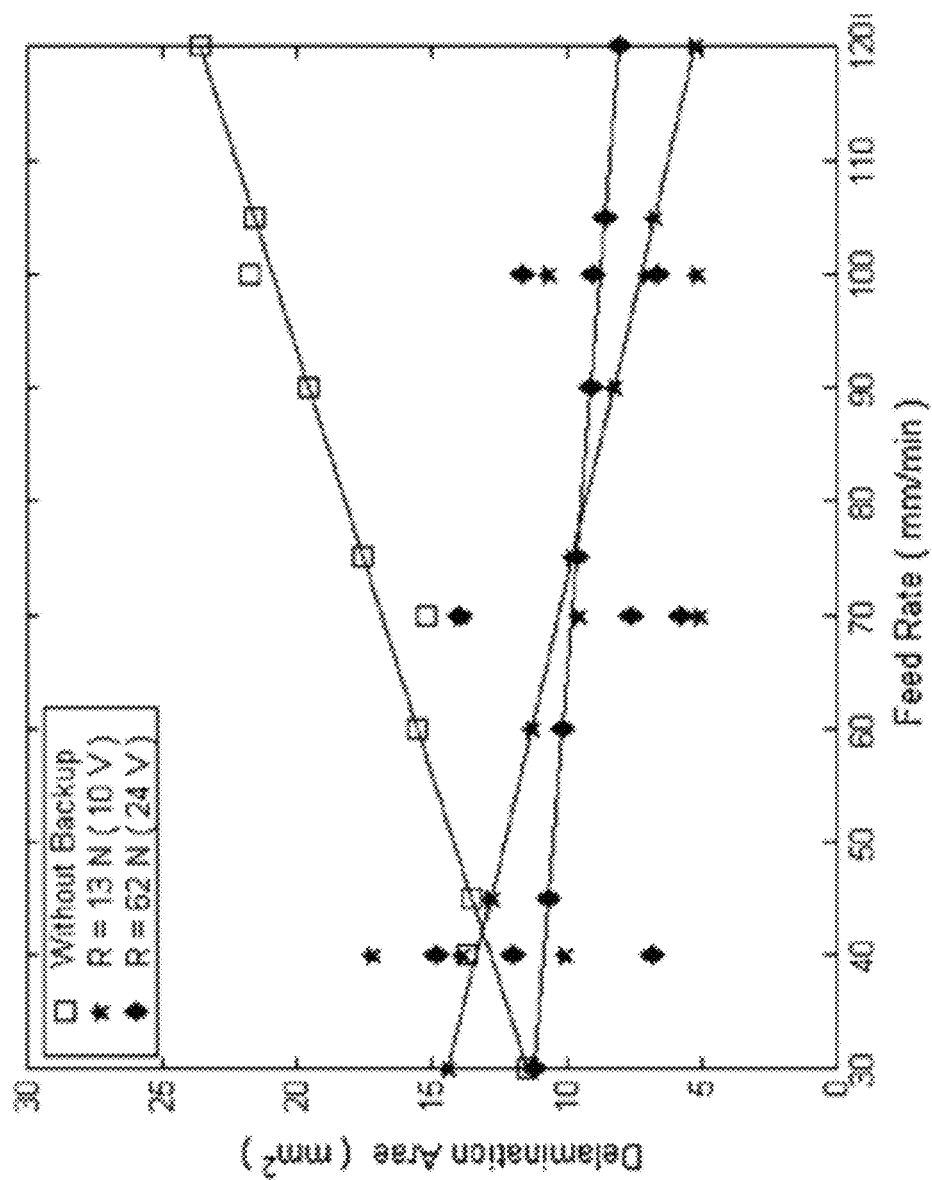
FIG. 12 shows an illustrative image of an ultrasonic C-scan demonstrating the extent of drilling-induced delamination (a) without and (b) with active backup.

FIG. 12 illustrates the effects of delamination reduction appear already at low level of the active backup force (R=13 N), with little difference in use of increased backing force R, which is considered advantageous for implementation or application of the method and apparatus of the present invention in, for example, drilling processing or manufacturing involving composite materials. In this particular exemplary experimental setup, low level of electromagnetic power is required for such method to be effective for reducing delamination in drilling. The effect of delamination reduction at low level of the active backup force R may be attributed to the fact of brittle fracture/breakage behavior between CFRP and epoxy resin as the tool thrust bends the laminate during drilling.

In view of the above experimental data and analysis, the axial thrust force $F_B$ can be identified significant to the production of delamination during drilling of composite materials. A comprehensive analysis of the critical thrust force without and with the active backup force in drilling of composite materials is presented in the current study based on classical elasticity, linear elastic fracture mechanics and energy conservation principle. The results reveal that the critical thrust force $F_B^*$ with the active backup force R can be elevated significantly than those without backup. In other words, the application of active backup force R can retard the onset of delamination A growth and reduce delamination damage at the drill exit in the workpiece, in particular at large feed rate when short cycle time is desired. The experimental findings verify the effects of delamination reduction by the use of active backup force. In addition, when the backup force R is applied closer to the drill bit, the suppression of delamination is more effective, and a low level of backup force R is sufficient to reduce delamination significantly.

While the invention has been particularly shown and described with reference to specific illustrative embodiments, it should be understood that various changes in form and detail may be made without departing from the spirit and scope of the invention as defined by the appended claims. Furthermore, the term "a", "an" or "one" recited above and in the claims is of the meaning of equivalent to "at least one". By way of example, the experimental data and analysis are also provided for illustrative purposes only and shall be treated as limitations to such particular or specific setup of the experimental equipment used.

What is claimed is:

1. A drilling apparatus capable of providing a reduction of delamination of composite materials, comprising:
    a workpiece of a composite material in a layered form with a thickness defined by a drill-entrance surface and a drill-exit surface opposite of said drill-entrance surface spaced apart therefrom;
    a supporting base provided on said drill-exit surface of the workpiece, configured to receive said workpiece and to restrict directional movements thereof;
    a drill bit for drilling of said workpiece with a thrust force $F_B$, having an outer perimeter of a bit radius C and a drilling axis O substantially perpendicular to said surfaces of the workpiece, provided on a side of said drill-entrance surface of the workpiece and to travel at a feed rate in a first direction toward said drill-exit surface thereof along the drilling axis O; and
    an active-force exertion mechanism for providing an active backup force R to said drill-exit surface of the workpiece in a second direction substantially parallel to said drilling axis O of the drill bit and at a contact region having an exertion distance δ away from said outer perimeter of the drill bit, further comprising a contact bracket at least partially contacting said drill-exit surface of the workpiece at said contact region and an adjustable force generator for driving said contact bracket to displace in said second direction toward said drill-entrance surface of the workpiece; and wherein said active backup force R is of a force magnitude correlated to said thrust force $F_B$ of the drill bit such that delamination of the workpiece is reduced,
    wherein said force magnitude of the active backup force R is correlated to said bit radius C of the drill bit and to said exertion distance δ of the contact region of the active-force exertion mechanism.

2. The drilling apparatus as claimed in claim 1, wherein said contact bracket of the active-force exertion mechanism is of a continuous circular form having a central perforation surrounded by an outer ring of a radius B substantially equivalent to the sum of said bit radius C of the drill bit and said exertion distance δ of the contact region.

3. The drilling apparatus as claimed in claim 1, wherein said thrust force $F_B$ is of a critical thrust force $F_B^*$ at an onset of crack propagation of said delamination, defined by $$F_B^* = \pi \sqrt{\frac{32 G_{IC} M}{[(1-\gamma^2) + 2\gamma^2(1+\xi)^2 s^2 - \gamma^2(1+\xi)^4 s^4]}}$$

and where $G_{IC}$ refers to a critical crack propagation energy per unit area, M refers to a flexural rigidity of the reinforced composite material, ξ is equivalent to said exertion distance divided by bit radius as ξ=δ/C, γ is equivalent to a ratio between said active backup force R and said thrust force $F_B$ as γ=R/$F_B$, and S is obtained from an extend A of said delamination and said bit radius C as S=C/A.

4. The drilling apparatus as claimed in claim 3, wherein said γ ratio is less than or equal to a value of 2 such that said force magnitude of the active backup force R provided on the drill-exit surface of the workpiece is less than or equal to twice the thrust force $F_B$ of the drill bit provided on the side of the drill-entrance of the workpiece.

5. The drilling apparatus as claimed in claim 1, wherein said adjustable force generator for driving said contact bracket utilizes a power actuator selected from any one of the following: electromagnetic actuator, hydraulic actuator, pneumatic actuator, motor-driven actuator, mechanical driver.

* * * * *